Sorbite Structure (Ordinary Cast Iron)

Instant Iron - Martensitic As Cast

Instant Iron - Still Martensitic After Drawing

Patented Sept. 10, 1940

2,214,651

UNITED STATES PATENT OFFICE 2,214,651

PISTON RING

Richard H. Bancroft, New Castle, Ind., assignor to The Perfect Circle Company, Hagerstown, Ind., a corporation of Indiana Original application April 30, 1937, Serial No. 139,891. Divided and this application February 8, 1939, Serial No. 255,183

2 Claims. (Cl. 309—44)

This invention relates to improvements in metallic piston rings, such as are adapted for use in internal combustion engines, and the process of manufacturing the same.

This application is a division of my co-pendng application Serial No. 139,891, filed April 30, 1937.

Prior to my invention piston rings usually have been made of cast iron, though some attempts have been made to produce piston rings of steel. The speed and power of internal combustion engines have been greatly increased during the past decade or two. Accordingly, piston rings are subjected to much higher temperatures and pressures and increased wear while at the same time more efficient or exacting performance of rings has been necessarily demanded—but not successfully attained—by reason of these conditions. Temperatures of 500° F. or higher are attained in the cylinders of modern internal combustion engines. It is well known that piston rings, prior to the advent of rings embodying my invention on the market, rapidly distorted in shape, lost some of their tension or resilience after a relatively short period of use, wore out quickly, and in some cases, scuffed, that is, abraded the cylinder walls. The cast iron rings usually had a structure of a sorbite, or pearlite nature, which has the advantage of being easily machined but has the disadvantages of being relatively soft and hence subject to too rapid wear. Such rings also tended to lose their tension and become distorted. Prior attempts to produce steel rings capable of withstanding the rigorous conditions of modern internal combustion engines and efficiently performing their intended functions have not been successful for various reasons. In most instances such rings, among other defects, became scuffed or they scuffed the cylinder walls.

It has long been well known, that a ferrous metal may be made martensitic by heating the metal above the critical temperature and then quench-cooling it. (The martensitic structure is characterized microscopically by its needle-like or acicular form, easily recognized by metallurgists.) Piston rings so formed would be wholly impractical. They would be not only too brittle and badly distorted from quenching shock for their intended functions and too hard to machine or finish, but the martensitic condition would be unstable when subjected to heat. In use in the engines, the martensite would decompose into softer forms such as troostite, sorbite or pearlite and the ring would distort or deform and wear rapidly.

One of the principal objects of my invention is to provide a piston ring which will overcome the above mentioned defects of prior piston rings. More particularly I provide a resilient metallic piston ring having a substantial or pseudo-martensitic structure, which is stable and permanent when subjected to the high pressure and temperatures present in an internal combustion engine, the ring at the same time being tough and highly wear-resisting, practically free from distortion, very durable, efficient throughout its life, and readily machinable during manufacture.

Another object of my invention is to provide a novel process of manufacturing my improved ring.

Other objects of my invention will appear from the following description thereof.

The accompanying photomicrographs are all taken at the same magnification, i. e., 1100 diameters.

Figure 1:
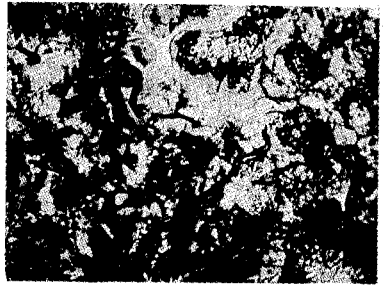
Fig. 1 is a photomicrograph of a cross-section of a piston ring made of ordinary cast iron in the usual manner.

It will be observed here that Fig. 1 shows the ordinary cast iron rings as having a highly sorbite structure and evidences no martensitic structure.

In carrying out my process, cast iron and suitable alloying material are melted into a molten mass and then poured into the rapidly cooled or chilled in a mold which may be of the usual conventional sand type employed in casting individual piston rings which are articles of relatively small cross-section. Different alloying metals or metalloids may be utilized and their proportions varied. They are so selected and proportioned as to extend the critical hardening range both downward and upward. The critical temperature may be variously defined as the point where the metal hardens, or as the point of transition from the austenitic state to the martensitic state, or as the temperature where alpha iron changes to the gamma state, as is understood in the metallurgical science. Examples of elements serving as critical depressants are molybdenum, copper, nickel, and manganese. On the other hand, silicon or chromium, for example, raise the critical hardening temperature. The amounts of such elements used depend largely on the rate of cooling in the mold, which in turn depends on the cross-sectional size of the piston ring. As a generality, the critical-depressing elements may be less than 2% of the mass and the critical-elevating elements less than 4% of the mass. It will be understood that the primary purpose of the latter elements is to prevent changes or decomposition of the ultimate martensitic structure when the ring is exposed to the temperatures existing in the cylinder of an internal combustion engine and even higher. I have found that gray cast iron having around 3.65% carbon content and alloyed with .55% manganese, .50% molybdenum, .86% copper, .31% chromium and 3.07% silicon suffices very well for piston rings of the general size ordinarily used in automobile engines. These proportions and the elements may vary widely and the foregoing analysis is merely given as an example for rings cast in sand molds.

Figure 2:
Fig. 2 is a photomicrograph of a cross-section of a piston ring after the same has been formed in the mold in accordance with my invention.

The mass of iron and selected elements may be melted in any suitable or standard furnace to a temperature of say 2700° F. or more and is then poured. Upon cooling in the sand, the rings are found to be intensely martensitic as shown in the photomicrograph of Fig. 2. This has been accomplished without resort to any quenching or liquid-cooling operation. The hard martensitic structure results from the use of the alloy material which has so extended the critical-hardening range as to utilize the heat of the melted metal as it cools normally in the mold.

The castings, as taken from the molds, are too hard for subsequent machining operation. By "machining operations" I mean the usual mechanical operations performed on a piston ring such as cutting the gap or joint, rough turning or grinding, boring and finishing turning or grinding.

Figure 3:
Fig. 3 is a photomicrograph of a cross-section of my completed piston ring.

The castings being too hard, I next reheat or "draw" at a temperature below the critical temperature but higher than 500° F. and allow the castings to cool. This draw, which may be at a temperature of from around 900° F. to around 1200° F. makes the metal soft enough to be readily machinable and increases the tension of the ring. Rings embodying my invention have a hardness of around 47 D Rockwell, the D Rockwell scale being a well-known standard scale for hardness. However, the metal retains a substantial or pseudo-martensitic structure due to the effect of the contained critical-elevating alloys. This structure is clearly manifest in the photomicrograph of Fig. 3.

The rings are then machined or semi-machined. I find it desirable to finish machine the flat edges of the ring, bore it, turn the periphery and cut the gap and then reheat the ring to a lower temperature than that of the draw but above the temperature to which the rings may be subjected to use in an internal combustion engine. This last or secondary heating operation is preferably performed at a temperature between 500° F. and 800° F. The secondary heating tends to relieve the strains and stresses which may have been set up in the ring during the machining operations and it also improves somewhat the tension of the ring. It does not, however, alter the stable pseudo-martensitic structure which has been permanently fixed during the prior high temperature. The maintenance of the substantial martensitic structure is essential to insure the resistance to abrasion or wear.

I finally finish turn the periphery of the ring, though this operation may be performed prior to the secondary heating operation.

I claim:

1. A resilient piston ring of gray cast iron of small radial cross sectional area having a stable and substantially martensitic structure throughout said radial cross sectional area as cast, said gray cast iron comprising the following elements in about the proportions specified: carbon 3.65%, silicon 3.07%, manganese .55%, chromium .31%, molybdenum .50%, copper .86%, and balance substantially iron, said cast ring retaining its substantially martensitic structure and having such hardness as to be capable of being readily machined after drawing at a temperature falling in the range between 900° F. to 1200° F.

2. A resilient piston ring of gray cast iron of small radial cross sectional area having a stable and substantially martensitic structure throughout said radial cross sectional area as cast, said gray cast iron comprising: carbon in excess of 3%, and about 3.07% silicon, .55% manganese, .31% chromium, .50% molybdenum, .86% copper, and balance substantially iron, said cast ring retaining its substantially martensitic structure and being resilient and having such hardness as to be capable of being readily machined and split after drawing at a temperature falling in the range between 800° F. and the critical temperature at which said martensitic structure would be destroyed.

RICHARD H. BANCROFT.